(12) United States Patent
Cheng et al.

(10) Patent No.: US 8,845,315 B2
(45) Date of Patent: Sep. 30, 2014

(54) INJECTION MOLDING APPARATUS HAVING A THERMOSTAT ASSEMBLY

(75) Inventors: Nien-Tien Cheng, New Taipei (TW); Ming-Hsiu Chung, New Taipei (TW)

(73) Assignee: Foxconn Technology Co., Ltd., New Taipei (TW)

( * ) Notice: Subject to any disclaimer, the term of this patent is extended or adjusted under 35 U.S.C. 154(b) by 30 days.

(21) Appl. No.: 13/597,239

(22) Filed: Aug. 28, 2012

(65) Prior Publication Data

US 2013/0323344 A1 Dec. 5, 2013

(51) Int. Cl.
*B29C 45/73* (2006.01)
(52) U.S. Cl.
USPC ........... 425/144; 264/40.6; 425/170; 425/547
(58) Field of Classification Search
USPC ................. 425/143, 144, 170, 547; 264/40.6
See application file for complete search history.

(56) References Cited

U.S. PATENT DOCUMENTS

| 4,955,804 A * | 9/1990 | Martell et al. ................. 425/548 |
| 7,168,942 B1 * | 1/2007 | Wieder .......................... 425/552 |
| 2009/0174101 A1 * | 7/2009 | Johnson ........................ 264/40.1 |

* cited by examiner

*Primary Examiner* — Tim Heitbrink
(74) *Attorney, Agent, or Firm* — Novak Druce Connolly Bove + Quigg LLP

(57) ABSTRACT

An exemplary injection molding apparatus includes a first mold defining a passage therein, a second mold engaging with the first mold, working fluid received in the passage of the first mold, and a thermal conductive member engaged in the first mold and thermally interconnecting the first mold and the working fluid. The first mold and the second mold cooperatively define a molding chamber therebetween adapted to receive injected molten material therein. The thermal conductive member transfers heat from the first and second molds to the working fluid when the first and second molds are hotter than the working fluid, and transfers heat from the working fluid to the first and second molds when the working fluid is hotter than the first and second molds.

20 Claims, 2 Drawing Sheets

INJECTION MOLDING APPARATUS HAVING A THERMOSTAT ASSEMBLY

BACKGROUND

1. Technical Field

The present disclosure relates to injection molding apparatuses, and more particularly to an injection molding apparatus having a thermostat assembly to adjust a temperature of the injection molding apparatus.

2. Description of Related Art

Numerous types of covers of electronic products are formed by various kinds of injection molding apparatuses. When a cover is manufactured, required molten material is injected into a molding chamber of the injection molding apparatus, then the injection molding apparatus is cooled, and finally the molded cover is removed from the injection molding apparatus. When the heat of the injection molding apparatus is dissipated slowly via natural convection and thermal radiation, the cover is manufactured slowly. When the heat of the injection molding apparatus is dissipated too quickly, the cover inside the injection molding apparatus contracts too quickly, leading to a plurality of air bubbles being formed in an outer surface of the cover. When this happens, the stability of the cover and the corresponding electronic product may be reduced, and the aesthetic appearance of the cover may be diminished.

It is thus desirable to provide an injection molding apparatus which can overcome the described limitations.

DETAILED DESCRIPTION

Embodiments of an injection molding apparatus will now be described in detail below and with reference to the drawings.

Figure 1:
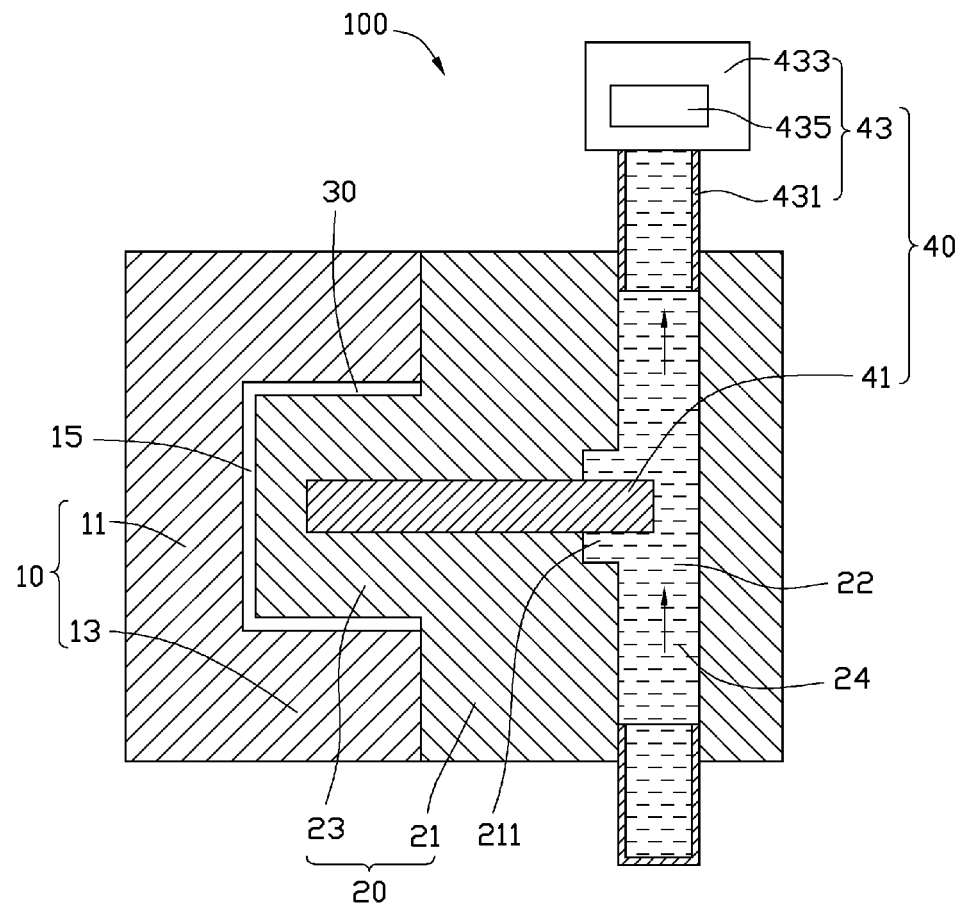
FIG. 1 is essentially a schematic, cross-sectional view of an injection molding apparatus of a first embodiment of the present disclosure.

In the description that follows, the stated orientations of all of the elements of the injection molding apparatus are with reference to the orientations of all of the elements as shown in FIG. 1.

Referring to FIG. 1, an injection molding apparatus 100 according to a first embodiment of the present disclosure includes a first mold, a second mold and a thermostat assembly 40. In this embodiment, the first mold is a male mold 20, and the second mold is a female mold 10. The male mold 20 and the female mold 10 engage with each other, and receive injected molten material therebetween to form a corresponding product. The thermostat assembly 40 is mounted on the male mold 20, to adjust a temperature of the male mold 20.

The female mold 10 is U-shaped, and includes a base plate 11, and two shoulders 13 formed on top and bottom ends of a front side of the base plate 11. The base plate 11 is elongated. Each shoulder 13 is rectangular. The shoulders 13 are spaced from each other. A front surface of the base plate 11 and inner surfaces of the shoulders 13 cooperatively define a cavity 15 therebetween. The cavity 15 is used to form a molding chamber 30 that receives the injected molten material therein when the male mold 20 and the female mold 10 are engaged with each other (see also below).

The inner surfaces of the shoulders 13 and the front surface of the base plate 11 cooperatively form a U-shaped bridge (not labeled) of the cavity 15. In this embodiment, the cavity 15 is rectangular shaped, that is, a rectangular parallelepiped. In other embodiments, a shape of the cavity 15 may be configured according to a shape of a corresponding product.

The male mold 20 includes a base 21, and a protruding portion 23 protruding from a central portion of a rear surface of the base 21. The base 21 is rectangular. The protruding portion 23 is rectangular and perpendicular to the base 21. A size of the protruding portion 23 is slightly smaller than that of the cavity 15 of the female mold 10. A passage 22 is defined in a front portion of the base 21. The passage 22 extends through the base 21 from top to bottom, and has working fluid 24 received therein. A recess 211 is defined in a center of an internal wall of the base 21 which bounds one side of the passage 22. The recess 211 extends rearward from the internal wall, and communicates with the passage 22.

When the female mold 10 engages with the male mold 20, the protruding portion 23 of the male mold 20 is received in the cavity 15 of the female mold 10, and front surfaces of the shoulders 13 abut and thermally contact top and bottom portions of the rear surface of the base 21. An outer periphery of the protruding portion 23 is spaced from the bridge of the cavity 15. The molding chamber 30 is defined between the protruding portion 23, the bridge of the cavity 15, and parts of the top and bottom portions of the rear surface of the base 21 which are adjacent to the protruding portion 23. The molding chamber 30 receives the injected molten material therein to form the product.

The thermostat assembly 40 includes a thermal conductive member 41 and a temperature regulating module 43. The temperature regulating module 43 includes a tube 431, a controller 433, and a heating and cooling device 435. The tube 431 is semi-annular. Opposite ends of the tube 431 are mounted on opposite top and bottom sides of the base 21, such that the tube 431 communicates with opposite ends of the passage 22. With such configuration, the tube 431 and the passage 22 cooperatively form a circulatory loop for the working fluid 24 to circulate along. The heating and cooling device 435 cools or heats the working fluid 24 to change the temperature of the working fluid 24. The controller 433 detects a temperature of the male mold 20 and the female mold 10, and can control the heating and cooling device 435 to heat or cool the working fluid 24 to alter the temperature of the working fluid 24 according to the detected temperature. That is, the heating and cooling device 435 is operatively associated with the controller 433 and the tube 431. Thereby, the controller 433 can adjust a cooling speed of the product received in the molding chamber 30, via heat exchange between the thermal conductive member 41 and the working fluid 24.

The thermal conductive member 41 is elongated. A major portion of the thermal conductive member 41 extends through the base 21 and is received in a center of the protruding portion 23 of the male mold 20 along a front to rear direction of the male mold 20, such that the thermal conductive member 41 thermally contacts the male mold 20. A front end of the thermal conductive member 41 is received in the recess 211 and the passage 22, and is thus exposed from the internal wall of the base 21 which bounds the one side of the passage 22. Accordingly, the front end of the thermal conductive member 41 thermally contacts the working fluid 24.

In use of the injection molding apparatus 100, the working fluid 24 circulates along the tube 431 and the passage 22, and the controller 433 detects the temperature of the female mold 10 and the male mold 20. When the temperature of the female mold 10 and the male mold 20 is lower than a predetermined threshold point, the controller 433 controls the working fluid 24 to be heated by the heating and cooling device 435. The exposed end of the thermal conductive member 41 absorbs heat of the working fluid 24, and the embedded portion of the thermal conductive member 41 heats the male mold 20 to decrease the cooling speed of the product in the molding chamber 30. When the temperature of the female mold 10 and the male mold 20 is higher than a predetermined threshold point, the controller 433 controls the working fluid 24 to be cooled by the heating and cooling device 435. The embedded portion of the thermal conductive member 41 absorbs heat of the male mold 20, and the exposed end of the thermal conductive member 41 male mold transfers the heat to the working fluid 24. Thereby, the cooling speed of the product in molding chamber 30 is increased.

Figure 2:
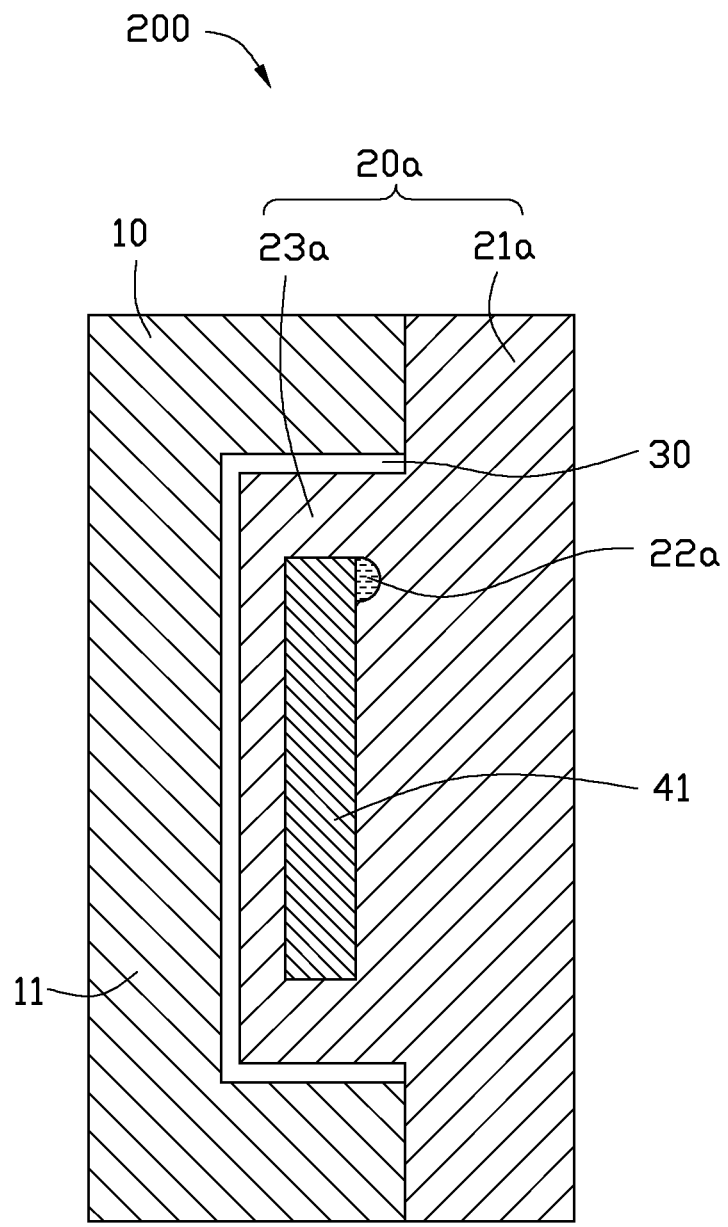
FIG. 2 is a schematic, cross-sectional view of part of an injection molding apparatus of a second embodiment of the present disclosure.

Referring to FIG. 2, this shows part of an injection molding apparatus 200 of a second embodiment of the present disclosure. The injection molding apparatus 200 is similar to the injection molding apparatus 100. However, the whole of the thermal conductive member 41 is embedded in a protruding portion 23a, of a male mold 20a. A passage 22a, is defined in the protruding portion 23a,, and directly communicates with a top end of the thermal conductive member 41. Thereby, working fluid (not labeled) in the passage 22a, contacts the top end of the thermal conductive member 41.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An injection molding apparatus comprising:
a first mold defining a passage therein;
a second mold engaging with the first mold, the first mold and the second mold cooperatively defining a molding chamber therebetween adapted to receive injected molten material therein;
working fluid received in the passage of the first mold; and
a thermostat assembly comprising a thermal conductive member thermally contacting the first mold and directly contacting the working fluid, a heating and cooling device, and a controller detecting a temperature of the first mold and the second mold and controlling the heating and cooling device to heat or cool the working fluid to adjust a temperature of the working fluid to alter a cooling speed of a desired product received in the molding chamber via heat exchange between the thermal conductive member and the working fluid.

2. The injection molding apparatus of claim 1, wherein the thermostat assembly further comprises a tube communicating with the passage of the first mold, the tube and the passage cooperatively form a circulatory loop, and the working fluid circulates along the circulatory loop.

3. The injection molding apparatus of claim 1, wherein the second mold is a female mold, and defines a cavity therein, the first mold is a male mold, and comprises a base and a protruding portion protruding from the base, and the protruding portion is inserted in the cavity and spaced from the female mold to define the molding chamber therebetween.

4. The injection molding apparatus of claim 3, wherein one portion of the thermal conductive member is embedded in the male mold and another portion of the thermal conductive member is exposed and received in the passage.

5. The injection molding apparatus of claim 4, wherein the one portion of the thermal conductive member extends through the base and is embedded in a center of the protruding portion of the male mold.

6. The injection molding apparatus of claim 4, wherein the passage is defined in a front portion of the base and extends through the base from top to bottom.

7. The injection molding apparatus of claim 6, wherein a recess is defined in a center of an internal wall of the base that bounds the passage, the recess communicates with the passage, and the other portion of the thermal conductive member is received in the recess and the passage.

8. The injection molding apparatus of claim 3, wherein the thermal conductive member is entirely embedded in the protruding portion of the male mold.

9. The injection molding apparatus of claim 8, wherein the passage is defined in the protruding portion and located at an end of the thermal conductive member.

10. The injection molding apparatus of claim 9, wherein an end of the thermal conductive member is exposed to the passage such that the working fluid contacts the end of the thermal conductive member.

11. The injection molding apparatus of claim 3, wherein the female mold comprises a base plate and two shoulders protruding from opposite ends of a front surface of the base plate, and the base plate and the shoulders cooperatively define the cavity therebetween.

12. The injection molding apparatus of claim 11, wherein the shoulders abut and thermally contact the base of the male mold.

13. An injection molding apparatus comprising:
a first mold containing working fluid therein;
a second mold engaging with the first mold, the first mold and the second mold cooperatively defining a molding chamber therebetween to receiving injected molten material therein; and
a thermostat assembly comprising a thermal conductive member thermally contacting the first mold and directly contacting the working fluid, and a temperature regulating module detecting a temperature of the first mold and the second mold and adjusting the temperature of the first mold and the second mold via heat exchange between the thermal conductive member and the working fluid to adjust a cooling speed of the molten material received in the molding chamber.

14. The injection molding apparatus of claim 13, wherein a passage is defined in the first mold, the working fluid is contained in the passage, and the thermal conductive member thermally contacts the first mold and the working fluid in the passage to exchange heat therebetween.

15. The injection molding apparatus of claim 14, wherein the temperature regulating module comprises a tube communicating with the passage, a heating and cooling device, and a controller detecting a temperature of the first mold and the second mold and controlling the heating and cooling device to heat or cool the working fluid to adjust a temperature of the working fluid to alter the cooling speed of the molten material received in the molding chamber.

16. The injection molding apparatus of claim 14, wherein one end of the thermal conductive member is embedded in the first mold and the other end of the thermal conductive member is exposed and received in the passage.

17. The injection molding apparatus of claim 16, wherein a recess is defined in the first mold and communicates with the passage, and the corresponding other end of the thermal conductive member is received in the recess and the passage.

18. The injection molding apparatus of claim 15, wherein the thermal conductive member is entirely embedded in the first mold.

19. The injection molding apparatus of claim 13, wherein the first mold is a male mold, and the second mold is a female mold.

20. An injection molding apparatus comprising:
a first mold defining a passage therein;
a second mold engaging with the first mold, the first mold and the second mold cooperatively defining a molding chamber therebetween adapted to receive injected molten material therein;
working fluid received in the passage of the first mold; and
a thermal conductive member engaged in the first mold and thermally interconnecting the first mold and directly contacting the working fluid, the thermal conductive member transferring heat from the first and second molds to the working fluid when the first and second molds are hotter than the working fluid, and transferring heat from the working fluid to the first and second molds when the working fluid is hotter than the first and second molds.

* * * * *